United States Patent [19]

Stoll

[11] Patent Number: 4,518,011

[45] Date of Patent: May 21, 1985

[54] CONTROL VALVE UNIT FOR THE CYLINDER OF A FLUID ACTUATOR

[76] Inventor: Kurt Stoll, Lenzhalde 72, 7300 Esslingen, Fed. Rep. of Germany

[21] Appl. No.: 403,167

[22] Filed: Jul. 29, 1982

[30] Foreign Application Priority Data

Jul. 30, 1981 [DE] Fed. Rep. of Germany ....... 3130056

[51] Int. Cl.[3] ........................ F15B 11/04; F16K 31/02

[52] U.S. Cl. ............................... 137/596.17; 137/596; 137/599; 137/637; 91/6; 91/31; 307/10 R

[58] Field of Search ................... 137/596.17, 596, 599, 137/601, 637; 91/6, 31; 307/132 E, 132 EA, 10 R

[56] References Cited

U.S. PATENT DOCUMENTS

| | | | |
|---|---|---|---|
| 2,999,482 | 9/1961 | Bower | 137/599 |
| 3,026,905 | 3/1962 | Nilsson | 137/637 |
| 3,038,449 | 6/1962 | Murphy, Jr. et al. | 91/6 X |
| 3,081,942 | 3/1963 | Maclay | 91/31 X |
| 3,746,041 | 7/1973 | Friedland | 137/601 |
| 3,785,389 | 1/1974 | Friedland et al. | 137/884 |
| 3,874,407 | 4/1975 | Griswald | 137/596.17 |
| 3,905,394 | 9/1975 | Jerde | 137/599 |

*Primary Examiner*—A. Michael Chambers
*Assistant Examiner*—John C. Fox
*Attorney, Agent, or Firm*—Flynn, Thiel, Boutell & Tanis

[57] ABSTRACT

A control valve cartridge which may be seated within the end plate of an actuator cylinder has a number of two way, two position solenoid valves placed in series axially and by way of which the space on each side of the piston may be connected by a respective control valve cartridge with a high pressure source or a low pressure source so as to give a programmable choke function.

17 Claims, 4 Drawing Figures

CONTROL VALVE UNIT FOR THE CYLINDER OF A FLUID ACTUATOR

FIELD OF THE INVENTION

The present invention relates to a control valve unit for a cylinder of a fluid actuator.

BACKGROUND OF THE INVENTION

It is presently normal for control valves for fluid-powered actuators with cylinders to be placed at some distance from them, for example in a control console, the ports of the control valve being joined up with the ports of the actuator cylinder by long fluid power pipes or leads.

It is, more specially, in the case of compressed air-powered fluid actuator cylinders disadvantageous because such long pipes are responsible for a slow response of the cylinder; furthermore, if control valves are placed in consoles or at some other position at some distance from the cylinder of the actuator, it is hard to make changes in the system.

SUMMARY OF THE INVENTION

For this reason, one purpose of the present invention is that of designing a control valve unit for a fluid cylinder actuator which makes it possible for the forward and backward speeds of the piston in the cylinder to be adjusted differently.

A further purpose of the invention is that of designing such a control valve unit which takes up little space so that it may be placed in, or integrated with, an end plate of an actuator cylinder without any great increase in the overall size of the end plate.

For effecting these purposes, and further purposes, the control valve unit for a cylinder actuator is characterized by having two separate two way, two position solenoid valves, two separate chokes joining the solenoid valves with separate connections of the actuator, the solenoid valves furthermore being designed to be joined up with a high pressure source and in the other case with a low pressure source, and a control circuit for positive push-pull control of the two solenoid valves.

The control valve unit of the present invention has two different working positions (forward and backward motion of the piston of the cylinder), which are directly joined or linked with a different degree of choke effect on the fluid flow. These working positions are made possible by having two separate solenoid valves, one of these being used for controlling the connection with the high pressure source while the other one is used for controlling the connection to the low pressure source, and there is furthermore a control circuit for preventing the two solenoid valves from being opened at the same time. In this way, any short-circuiting between the high and the low pressure sources in the control valve unit is not possible. Because the control valve unit of the present invention may be placed next to or fixed on the actuator cylinder, dead space is very much cut down and a quicker and more exact operation of the cylinder is made possible, as may be necessary for many purposes, more specially in the case of pneumatic cylinder actuators used in packaging machines.

As a further development of the invention the control circuit is made up of: a differentiating circuit, a bistable multivibrator having one input joined directly and an other input joined by way of an inverter with an output of the differentiating circuit, a monostable multivibrator, AND-gates having inputs joined with outputs of the bistable monovibrator and having second inputs joined up invertingly with the output of the monostable multivibrator, and an AND-gate for supplying input signals of the bistable monovibrator to the monostable vibrator, the purpose of this design being to make certain that, after shutting one solenoid valve, a certain amount of time goes by, the unit functioning correctly, before the other solenoid valve is opened.

In order to make the control of the two solenoid valves completely the same in the two cases, the bistable multi-vibrator may have two bistable stages, with crossed over input connections, one equivalent output of such stages being joined up with the first inputs of the AND-gates.

For making possible, in a simple way, a neutral position of the control valve unit, while on the other hand making possible further changes in the flows of fluid to and from the actuator, using the choke joined up with the third solenoid valve, it is possible for the unit to be so designed that between the network junction which is placed between the chokes joined up with the solenoid valves on the load side, and the actuator connection opening, a third two way, two position solenoid valve is put in the circuit.

As part of a further development of the invention, the control valve unit has further two way, two position solenoid valves in parallel to the third two way, two position solenoid valve to give a programmable choking effect on backward and forward piston motion.

In order for it to be possible for the valve control unit to make use of solenoid valves which are the same in structure and which are simply placed axially in series, each such solenoid valve may have: a disk-like valve housing, in which, opposite to each other, there are two connection ducts formed running from one end face to the other, such ducts being able to be joined up by way of a transverse connection duct which is cut by a valve seat; a valve body able to be moved at a right angle to end faces of the housing and designed for use with a valve seat, the valve body having a magnetic or magnetizable material; a spring for biasing the valve into the shut position thereof; and a ring-like coil placed radially outside the valve body and coaxial thereto.

The valve seat and the outline of the valve body may be cone-like, such a design being useful inasfar as large flow cross-sections, with a small valve body stroke, are produced and furthermore the valve bodies, because of their self-centering effect, do not need a separate guiding system, that is to say they are simply supported, for example, on their biasing springs.

If the valve seat is placed at the middle of the connecting duct, the useful effect is produced that the separate solenoid valves take up less space in a radial direction.

As a further development of the invention, the valve control unit may have a spacer disk controlling the opening motion of the valve body and placed in a coil core for the ring-like coil, this being for the purpose of producing a different and very simple adjustment of the flow cross-sections of the separate solenoid valves, that is to say simply by using a spacer disk geared to the desired flow cross-section.

The same useful effect may be produced with a further development of the invention having at least one choke sleeve which is placed with a true fit in one of the connection ducts, the choke sleeve having a choke opening lined up with the connection duct; in this case it is possible for the flow cross-section to be changed even when the solenoid valve is in its fully put-together condition.

For producing a powerful magnetic force on the valve body while having a small ring-like coil, the valve body may be bell-like and have a permanent magnet fixed on its floor.

As a further development of the invention, the valve housings may have isolated through-ducts placed at an angle to the connection ducts and, as well, running from one end face of the valve housing to the other, this being to make certain that the valve housing of one solenoid valve may be used as well for producing fluid connections running to a solenoid valve placed at the back thereof.

As part of a further useful development of the invention the first solenoid valve and the second solenoid valve are coaxial to each other and out of line in angle with each other. Furthermore the through-ducts of the first solenoid valve are in line with the connection ducts of the second solenoid valve. Between the first and second solenoid valves there is a disk-like adapter part with the same cross-section outline and which has a through-duct for joining the one through-duct of the first solenoid valve with the in-line connection duct of the second solenoid valve and has a diverting or deflection duct for joining the second connection duct on the load side of the first solenoid valve with the second connection duct, on the load side, of the second solenoid valve. The first connection duct of the second solenoid valve is fluid-tightly shut off at the end furthest from the adapter part.

The useful effect produced here is that the valve unit may be designed to take up very little space and may be made up using solenoid valves which are the same in structure.

To make it possible for the sealing plates, which are in any case present, to be used for shutting off the first connection duct of the second solenoid valve, that is to say the exhaust or waste line, the first connection duct of the second solenoid valve is shut off by a sealing plate running thereacross and having the second solenoid valve and the third solenoid valve on opposite sides thereof.

As a further useful development of the invention, the control valve unit may have a cover part with the same cross-section outline as the valve housing which has two connectors, of which one connector is in line with the through-duct joined up with the second solenoid valve and the other is in line with the connection duct, on the inlet side, of the first solenoid valve. With this further development of the invention, it is possible to make certain, in a simple way, that the free ends of the connection duct, not used on the input side, and of the through-duct not used on the input side, of the first solenoid valve are shut off, while at the same time making it simple for the pressure fluid supply line and the pressure fluid exhaust or waste line to be simply joined up.

As part of a further development of the invention, the unit has a floor part with a deflection duct opening at the end face facing the valve housing adjacent thereto, at a point in line with the outlet-side connection duct, and running to the outer face of the floor part. Such a control valve unit may be very simply housed within the end plate of the actuator, because the driving fluid opening of the valve unit is radial so that it may be used with the connection opening (radially directed as well) of the actuator. Such connection opening is very simple to make in the end plate of the cylinder of the actuator and, furthermore, the complete control valve unit may be sealed off in a very simple way within the hole, in which it is placed, in the cylinder end plate by using O-rings.

BRIEF DESCRIPTION OF THE DRAWINGS

An account will now be given of the invention using one working example to be seen in the figures.

DETAILED DESCRIPTION

Figure 1:
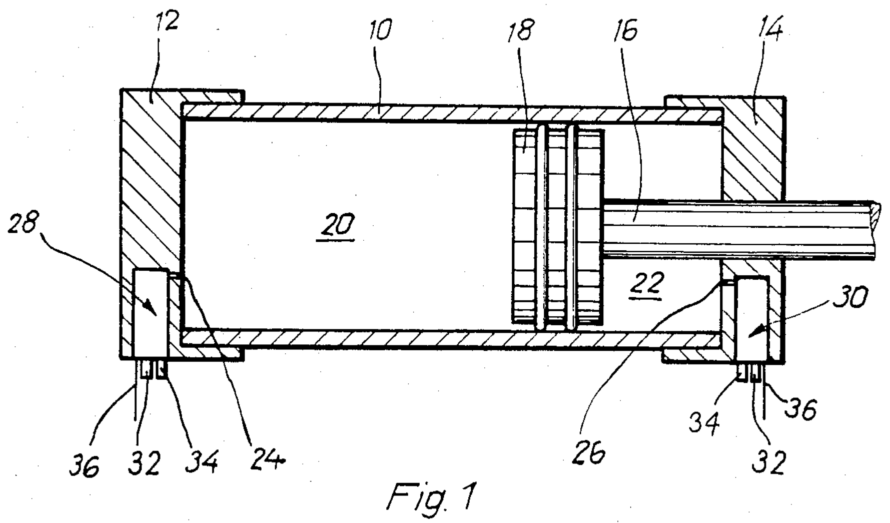
FIG. 1 is an axial section through a pneumatic cylinder actuator with control valve cartridges placed within end plates of the cylinder.

The pneumatic cylinder actuator to be seen in FIG. 1 has a cylinder 10, shut off at its ends by cylinder end plates 12 and 14. The cylinder has a piston 18 joined with a piston rod 16. On the two sides of the piston 18, fluid, that is to say compressed air, spaces 20, 22 are joined up with ports 24, 26 which may be joined up by way of control valve cartridges 28, 30, with a compressed air source in the one case, or with the atmosphere by way of an exhaust pipe in the other case. The control valve cartridges 28 and 30 have, in each case, a compressed air supply port 32 and compressed air exhaust port 34 and are joined up by way of a control cable 36 with a control circuit, of which a more detailed account will be given herein. Such cartridges make upkeep and renewal simpler.

Figure 2:
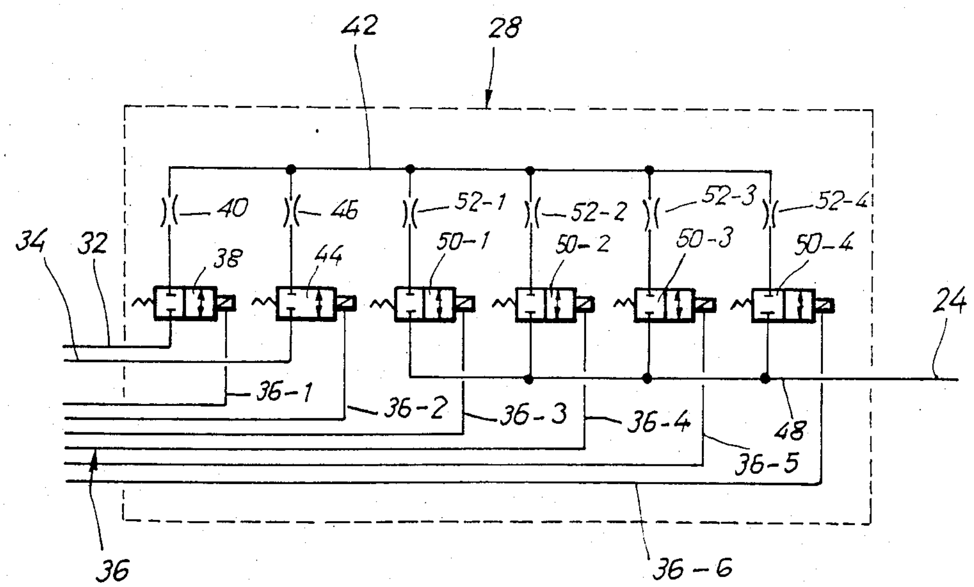
FIG. 2 is a schematic diagram of a control valve cartridge as used in the structure of FIG. 1.

FIG. 2 is a schematic of the control valve cartridge 28, control valve cartridge 30 having the same structure so that no separate detailed account is necessary in its case.

The supply port 32 is joined up with the input port of a first two way, two position solenoid valve 38 whose output port is joined up by way of a choke 40 with a distribution line 42.

The exhaust line 34 is joined up with the output port of a second two way, two position solenoid valve 44, whose input port is joined up by way of a choke 45 with the distribution line 42.

Between the distribution line 42 and an output line 48, joined up with the connection port 24, four two way, two position solenoid valves 50-1 to 50-4 are placed in parallel, each being joined up with a choke 52-1 to 52-4 in series. Control of the solenoid valves 38, 44 and 50-1 to 50-4, biased by springs into their shut positions, is by way of control lines 36-1 to 36-6, which are joined to the control cable 36 as a single cable structure.

An account will now be given of the operation of the control cartridge 28.

If no signal is present at any one of the control lines 36-3 to 36-6, the output line 48 is shut off, the same naturally being true if, in addition, line 36-1 to 36-2 as well do not get any signal.

Lines 36-1 and 36-2 are only acted upon by signals from the control circuit in a push-pull mode, as will be made clear in more detail later in association with FIG. 4, that is to say so that at any one time only one of the solenoid valve 38 or valve 44 will be opened and a flow of air will be able to make its way, at a rate dependent on the size of the choke 40 or 46 in the other case, to or from the actuator cylinder, a further programmable choking effect being produced by a combination of those solenoid valves 50-1 to 50-4 which are in fact opened.

It will be seen from this that it is possible for the speed of the cylinder actuator to be programmed in the working and return strokes differently by way of the signal combination acting by way of control lines 36-1 to 36-6.

Figure 3:
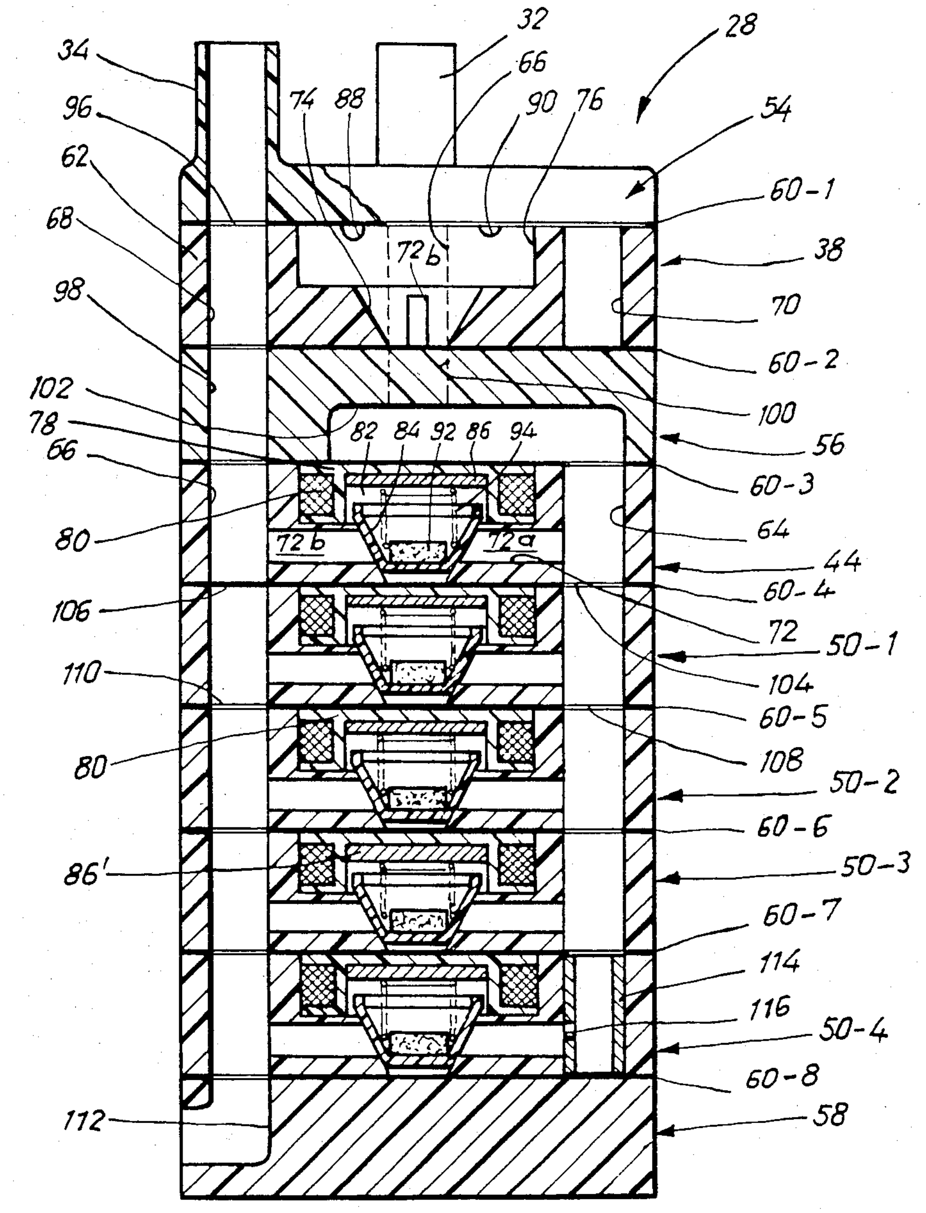
FIG. 3 is an axial section through the working example of a many-stage control valve cartridge.

As will be clear from FIG. 3, the control valve cartridge 28 (and the control valve cartridge 30 which is the same in structure) is made up of a cover part or end member 54 having the supply port 32 or connection and the exhaust port 34 or connection, the solenoid valve 38, adapter part 56, the solenoid valve 44, the solenoid valves 50-1 to 50-4, and floor part 58 (and sealing plates 60-1 to 60-8 placed between these parts).

The parts so far listed are placed in series and coaxially, each of them having the same outline of their cross-sections so that the control valve cartridge 28 may generally by said to have a smooth outer face which may have O-rings placed on it for producing a seal between the outer face of the cartridge and the inner wall of a hole in the cylinder end plate 12 into which it is placed.

The solenoid valves all have the same structure, of which an account will now be given for solenoid valves 38 and 44. As may be seen from FIG. 3, the solenoid valve 38 is twisted so as to be 90° out of line with the other solenoid valves, only its valve housing being seen in the figure; the rest of the valve parts, which are of the same design as in the other solenoid valves, are not to be seen in the figure so as to make the same more straightforward.

The solenoid valves have a valve housing 62 of small axial size and in which two connection ducts or channels 64 and 66 are formed so as to be diametrally opposite to each other, such ducts running axially from one end face of the housing to the other.

Two isolated through-ducts 68 and 70, with an angle of 180° between them, are present in the valve housing 62, such ducts 68 and 70 again running in an axial direction from one end face of the housing to the other.

The connection ducts 64 and 66 may be joined up with each other by way of a connection duct 72 near the lower end of the valve housing 62. At the middle of such duct 72 there is a frustoconical valve seat 74 cutting up duct 72 into two duct lengths 72*a* and 72*b*.

Valve housing 62 furthermore has a cylindrical pocket 76 opening towards the top end face of the housing 62 and in which a lined-up coil core 78 is seated, on which there is a ring-like coil 80. Coil core 78 has a middle opening 82 to take up a bell-like, frustoconical valve body 84, which may be moved with play.

A spacer disk 86 is seated in opening 82 with a force fit, the axial size of the disk 86 being such as to give the desired adjustment of the open position of valve body 84. Two cutouts 88 and 90, spaced by 90°, in the top limit of the pocket 76 take up the electrical leads of the ring-like coil 80 so that the leads of all solenoid valves are in line with each other (except that in the case of the solenoid valve 38 they are out of line by 90°, as well)

On the floor of valve body 84, there is a small permanent magnet 92 of sintered material which is adhesively fixed and which, at the same time, has the function of a support for the lower end of a coiled compression spring 94, the same biasing the valve body 84 into its shut position and which is supported on the spacer disk 86 (if present) or otherwise on the floor, lined up with the top side of the valve housing, of the coil core 78.

The sealing plate 60-1, placed between the cover part 54 and the solenoid valve 38 has an opening 96 through it, by way of which the exhaust port 34 is joined up with the through-duct 68 of the solenoid valve 38, and a further opening, not to be seen in the figure, by way of which the supply port 32, placed in front of the section plane, is joined up with the connection duct 64 (which is not to be seen in the figure and is placed in front of the section plane as well) of the solenoid valve 38.

The adapter part 56 has an isolated through-duct 98, producing the connection between the through-duct 68 of the solenoid valve 38 and the connection duct 66 of the solenoid valve 44 (to which end sealing plate 60-2 and 60-3 have openings therethrough), and furthermore a connection duct 100 which is joined up with the connection duct 66 of the solenoid valve 38 by way of a further opening through the sealing plate 60-2, connection duct 100 opening into a deflection space 102 (open towards the lower side of the adapter part 56) which is joined up with the connection duct 64 of the solenoid valve 44 by way of an opening through the sealing plate 60-3.

The sealing plate 60-4 has only a single opening 104 therethrough, by way of which the connection duct 64 of the solenoid valve 44 is joined up with the connection duct 64 of the solenoid valve 50-1, an unbroken part 106 of the sealing plate on the other hand separating the connection duct 66 of the solenoid valve 44 from the connection duct 66 of the solenoid valve 50-1.

The sealing plates 60-5 to 60-7 (and, to make the sealing plates the same as far as possible and make stock-holding simpler, the sealing plate 60-8 as well) have, in each case, openings 108 and 110 therethrough lined up with the connection ducts 64 and, in the other case, 66 of the different solenoid valves, the connection ducts 64 of the solenoid valves 50-1 to 50-4, for this reason. together forming the distribution line 42 of FIG. 2, while their connection ducts 66 together make up the output line 48 of FIG. 2.

The end member or bottom part 58 has an angled deflection duct 112 which, at one end, is lined up with the connection ducts 66 and at the other end opens through the outer face of the floor part 58.

The solenoid valve 50-3 has a spacer disk or shim 86' thicker than the spacer disk 86 so that the opening cross-section of solenoid valve 50-3 is smaller than that of the rest of the solenoid valves.

Another possible way of decreasing the flow cross-section is given in the case of solenoid valve 50-4. A choke sleeve 114 is force-fitted into connection duct 64, sleeve 114 having a choke opening 116 lined up with the connection duct 72.

The different segments of the control valve cartridge 28 are kept together by bolts with a pulling effect, which are not to be seen in the figure and which are placed in a circumferential direction between the through-ducts and the connection ducts of the solenoid valves, that is to say along the outer face of an imaginary cylinder, such bolts stretching through the control valve cartridge from end to end thereof, or in place of bolts, the separate valve segments may be joined together adhesively.

Figure 4:
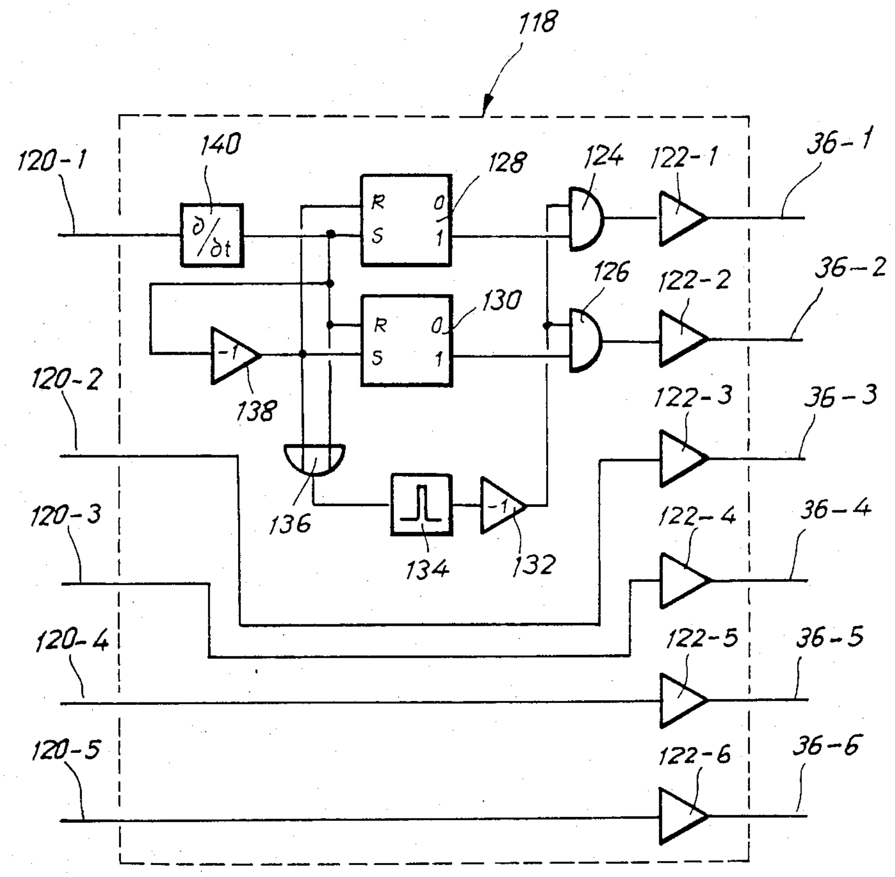
FIG. 4 is a schematic diagram of the electrical control circuit for the control cartridge of FIGS. 2 and 3.

FIG. 4 is a view of the control circuit 118 for use with the control valve cartridge 28 or 30 and producing, as an answer to the input of a 5-bit instruction word at input conductors 120-1 to 120-5 the necessary driving signals for solenoid valves 38, 44 and 50-1 to 50-4 by way of control conductors 36-1 to 36-6.

After being amplified in power amplifiers 122-3 to 122-6, the signals conducted by input conductors 120-2 to 120-5 are directly used for driving the solenoid valves 50-1 to 50-4. Power amplifiers 122-1 and 122-2 for the solenoid valves 38 and 44 have their inputs joined up with the output of an AND-gate 124 in the one case, and 126 in the other case.

One input of each of the AND-gates 124 and 126 is joined up with the "1" output of a bistable multivibrator 128 or, in the other case, 130, for use therewith, while the second inputs of the AND-gates 124 and 126 are joined up by way of an inverter 132 with a monostable multivibrator 134, which may be triggered by way of an OR-gate 136 by the output signal or the inverted (138) output signal of a differentiating circuit 140, which on the input side is joined up with the input conductor 120-1.

OPERATION OF THE CONTROL CIRCUIT 118

When a "1" signal gets to the input conductor 120-1, the rising signal edge has the effect of setting the bistable multivibrator 128 and resetting the bistable multivibrator 130. For the time of the pulse of the monostable multivibrator 134, the AND-gate 124 is kept turned off for reasons of safety and then, at the control conductor 36-1, an output signal is produced having the effect of opening solenoid valve 38. The working stroke of the actuator cylinder is now started.

At the end of a "1" signal conducted by way of input conductor 120-1, there is a setting of the bistable multivibrator 130 caused by the falling signal edge and the bistable multivibrator 128 is reset and when the period of the monostable multivibrator 134 has run to an end, a signal is produced conducted by control conductor 36-2, by which the solenoid valve 44 is opened so that the return stroke of the actuator cylinder may now be started.

If there is no signal being conducted by any one of the input conductors 120-2 to 120-5, the actuator cylinder will be locked or latched by the control valve cartridge 28. On a signal being conducted by the input conductors 120-5 to 120-2, there will be an adjustment to an increasing size of the acting flow cross-section of the control cartridge. Further changes in the flow cross-section by the effect of signals using combinations of the input conductors 120-2 to 120-5 are possible.

In the case of the control circuit used with the control valve cartridge 30, it is best for the input conductors 120-2 to 120-5 to be used for transmission of the same control signals as the corresponding input conductors of the control circuit 118, while the input conductor 120-1 of the second control circuit may be used for the inverse of the corresponding signal for the first control circuit.

If desired, the acting flow cross-section into and out of a pneumatic cylinder may be made different by the right selection of the control signal combinations so that a different damping property will be produced with the actuator cylinder in its two opposite directions of motion, as an answer to interfering forces acting on the piston from the outside.

The embodiments of the invention in which an exclusive property or privilege is claimed are defined as follows:

1. A valve arrangement for selectively providing fluid communication between a working chamber of a fluid actuated cylinder and a selected one of a pressurized fluid source and a fluid sink, comprising: a first valve mechanism which includes a plurality of two-way, two-position electromagnetic first valves which are connected in parallel with each other and which each include and control fluid flow through a respective throttled flow path; a second valve mechanism which includes second and third two-way, two-position electromagnetic valves which each have a first port which is in fluid communication through a distributor line with a first port of each said valve of said first valve mechanism and which each have a second port adapted to be connected to a respective one of the fluid source and fluid sink; and control circuit means for selectively actuating said valves, said control circuit means actuating only one of said valves of said second valve mechanism at any given time; wherein said valves of said first valve mechanism each have a second port adapted to be connected to a port of the fluid actuated cylinder; and wherein all of said valves are structurally identical and are parts of a single valve cartridge; whereby a piston movably supported in the working chamber of the cylinder moves at a speed which can be regulated by selectively actuating said valves of said first valve mechanism.

2. The valve arrangement according to claim 1, wherein said valves each include: a disk-shaped valve housing having two diametrically opposite connecting channels which extend axially therethrough from a first end surface to a second end surface; a transverse channel which has a valve seat; a valve member which can be moved in a direction approximately perpendicular to said end surfaces of said housing, said valve member being movable to a closed position in which it cooperates with said valve seat so as to obstruct fluid flow through said transverse channel and having means defining a magnet; a spring which yieldably urges said valve member into said closed position; and an annular coil which is arranged radially outwardly of said valve member and coaxially with respect thereto.

3. The valve arrangement according to claim 2, wherein said valve seat of each said valve and an outer surface of the associated valve member which is engageable with such valve seat are frustoconical.

4. The valve arrangement according to claim 2, wherein said valve seat of each said valve is approximately intermediate said connecting channels.

5. The valve arrangement according to claim 2, wherein each said valve includes a spacer disk which limits the opening movement of said valve member and is inserted in an opening in a coil member which supports said coil.

6. The valve arrangement according to claim 2, including a choke sleeve which is inserted with a close fit into one of said connecting channels of one of said valves and has a choke opening therein which is in alignment with said transverse channel of such valve.

7. The valve arrangement according to claim 2, wherein said valve member of each said valve is cup-shaped and said magnet of each said valve is a permanent magnet which is secured on a bottom surface thereof.

8. The valve arrangement according to claim 2, wherein each said valve housing has two through channels which are angularly offset from said connecting channels and extend axially therethrough from said first end surface to said second end surface.

9. The valve arrangement according to claim 8, wherein said valve housings of said second and third valves are offset angularly with respect to one another so that said through channels of said second valve are each in alignment with a respective said connecting channel of said third valve; wherein between said second and third valves there is provided a disk-shaped adapter part which has an exterior surface with the same cross-sectional contour as said valve housings, which has a through channel which connects a first said through channel of said second valve with a first said connecting channel of said third valve and which has a guide channel which connects a first said connecting channel of said second valve with a second said connecting channel of said third valve; and including seal means for sealingly closing said first connecting channel of said third valve at an end thereof remote from said adapter part.

10. The valve arrangement according to claim 9, wherein said seal means includes a sealing plate which is clamped between said third valve and one of said first valves.

11. The valve arrangement according to claim 9, including a lid part having an exterior surface with the same cross-sectional contour as said valve housings and having two axial channels therein, one of which is in alignment with said first through channel of said second valve and the other of which communicates with a second said connecting channel of said second valve.

12. The valve arrangement according to claim 9, including a bottom part which has a guide channel which opens through an end surface which faces an axially adjacent valve housing of one said first valve so as to be in alignment with a connecting channel in such valve housing, and which opens at its other end through a radially facing outer surface of said bottom part.

13. A valve cartridge, comprising: spaced first and second end members which each have a surface thereon; an adapter member disposed between and spaced from said first and second end members and having two surfaces on opposite sides thereof; a first valve, a second valve, and a plurality of third valves, each of said first, second and third valves including a valve housing having two surfaces on opposite sides thereof, including first and second connecting channels and a through channel which each extend through said valve housing from one to the other of said surfaces thereon, including a connecting duct extending between and communicating with said first and second connecting channels, including valve means for selectively facilitating and obstructing fluid flow through said connecting duct, and including throttle means for limiting the rate of fluid flow through said connecting duct to a predetermined value when said valve means is permitting fluid flow therethrough, wherein said first valve is disposed between said first end member and said adapter member and said surfaces on said first valve are respectively adjacent said surface on said first end member and one of said surfaces on said adapter member; means defining first and second passageways in said first end member which are respectively in fluid communication with said first connecting channel and said through channel in said first valve, wherein said second valve is disposed between said adapter member and said second end member and one of said surfaces on said second valve is adjacent one of said surfaces on said adapter member; means defining a first passageway in said adapter member which provides fluid communication between said second connecting channel in said first valve and said first connecting channel in said second valve and defining a second passageway in said adapter member which provides fluid communication between said through channel in said first valve and said second connecting channel in said second valve, wherein said plural third valves are disposed serially between said second valve and said second end member, two outermost said third valves each having one of said surfaces thereon adjacent a respective one of said surface on said second end member and one of said surfaces on said second valve, and the remainder of said surfaces on said third valves each being adjacent a said surface on an adjacent said third valve, said first and second connecting channels in said second valve respectively being aligned with said first and second connecting channels in said third valves, said second connecting channels in said third valves being in fluid communication with each other and said first connecting channels in said third valves being in fluid communication with each other and with said first connecting channel in said second valve; means for obstructing fluid communication between said second connecting channels in said second valve and the adjacent third valve; and means defining a passageway in said second end member which is in fluid communication with said second connecting channel in the third valve adjacent thereto.

14. The valve cartridge according to claim 13, including a first sealing plate which is sealingly disposed between said adjacent surfaces of said first end member and said first valve and has openings therethrough aligned with said first and second passageways in said first end member, a second sealing plate which is sealingly disposed between said adjacent surfaces of said first valve and said adapter member and has openings therethrough which are respectively aligned with said through channel and said connecting channels of said first valve, a third sealing plate which is sealingly disposed between said adjacent surfaces of said adapter member and said second valve and has openings therethrough respectively aligned with said first and second connecting channels in said second valve, a fourth sealing plate which is sealingly disposed between said adjacent surfaces of said second valve and the adjacent third valve and has an opening therethrough aligned with said first connection channel in said second valve, a respective fifth sealing plate sealingly disposed between the adjacent surfaces of each adjacent pair of said third valves and having openings therethrough which are respectively aligned with said first and second connection openings in said third valves, and a sixth sealing plate which is sealingly disposed between said adjacent surfaces of said second end member and the adjacent third valve and which has an opening therethrough aligned with said passageway in said second end member, said fourth sealing plate being said means for obstructing fluid communication between said second connecting channels in said second valve and the adjacent third valve.

15. The valve cartridge according to claim 13, wherein said throttle means includes a sleeve which is snugly disposed in one of said connecting channels of one of said third valves and which has an opening in a wall thereof aligned with the associated connecting duct.

16. The valve cartridge according to claim 13, wherein said first and second end members, said adapter member and said valve housings of said first, second and third valves are disklike members having exterior surfaces with substantially identical cross-sectional contours.

17. The valve cartridge according to claim 13, wherein each said valve means includes a valve seat provided in the associated connecting duct, a valve member supported for movement between a closed position in which it is engaging said valve seat and obstructing fluid flow through the connecting duct and an open position in which it is spaced from the valve seat and permitting fluid flow through the connecting duct, resilient means yieldably urging said valve member toward its closed position, and electromechanical means for causing said valve member to move away from said closed position against the urging of said resilient means; and wherein said throttle means includes means for precisely determining the open position so that the space between said valve member and said valve seat in said open position permits only a predetermined rate of fluid flow through the connecting duct.

* * * * *

UNITED STATES PATENT AND TRADEMARK OFFICE

CERTIFICATE OF CORRECTION

PATENT NO. : 4 518 011

DATED : May 21, 1985

INVENTOR(S) : Kurt STOLL

It is certified that error appears in the above-identified patent and that said Letters Patent is hereby corrected as shown below:

Column 8, line 65; delete "thereof" insert ---of said valve member---.

Column 10, line 40; change "said connecting channels of said" to ---said second connecting channel of said---.

line 49; change "connection" to ---connecting---.

line 54; change "tion openings" to ---ting channels---.

Signed and Sealed this

*Fourth* Day of *February 1986*

[SEAL]

*Attest:*

DONALD J. QUIGG

*Attesting Officer* *Commissioner of Patents and Trademarks*